United States Patent [19]

Sakai et al.

[11] Patent Number: 4,851,024
[45] Date of Patent: Jul. 25, 1989

[54] PROCESS FOR PRODUCING OPTICAL GLASS

[75] Inventors: Hiroyuki Sakai, Fussa; Shigeaki Ohmi, Tokorozawa; Yoshitaka Yoneda, Akishima; Yoshiyuki Asahara, Mizuho, all of Japan

[73] Assignee: Hoya Corporation, Tokyo, Japan

[21] Appl. No.: 148,570

[22] Filed: Jan. 26, 1988

[30] Foreign Application Priority Data

Jan. 31, 1987 [JP] Japan .................................. 62-20677

[51] Int. Cl.$^4$ ...................... C03C 21/00; C03B 37/027
[52] U.S. Cl. ...................................... 65/3.14; 65/30.13
[58] Field of Search ................. 65/2, 3.11, 3.14, 30.13

[56] References Cited

U.S. PATENT DOCUMENTS

| | | | |
|---|---|---|---|
| 3,843,228 | 10/1974 | Yoshiyagawa et al. | 65/3.14 X |
| 3,880,630 | 4/1975 | Izawa | 65/3.14 X |
| 4,455,160 | 6/1984 | Rittler | 65/30.13 |

FOREIGN PATENT DOCUMENTS 49-22467  6/1974  Japan .................................. 65/3.14

Primary Examiner—Robert L. Lindsay
Attorney, Agent, or Firm—Nixon & Vanderhye

[57] ABSTRACT

A uniform refractive index-type glass is prepared by ion exchange in which a glass containing ions of a first type is immersed in a molten salt containing ions of a second type, the ions in the molten salt having a higher refractive index than the ions in the glass. The glass is removed from the molten salt at a predetermined point and before the saturation point or equilibrium and the ion distribution becomes uniform throughout the glass. The concentration of first and second ions is not uniform from the center of the glass to its outer surface. The glass is next heated to make the concentrations of the first and second ions substantially uniform throughout the glass from the center to the outer surface. Optionally, this glass is then immersed in a molten salt containing a third type of ion having a lower refractive index than the second ion for exchange with part of the ions in the second type. A gradient refractive index-type glass in which the concentration of the second type of ions decreases parabolically from the center of the glass to the outer surface while the concentration of the third type of ions increases parabolically from the center of the glass to the outer surface.

11 Claims, 7 Drawing Sheets

PROCESS FOR PRODUCING OPTICAL GLASS

BACKGROUND OF THE INVENTION

1. Field of the Invention

The present invention relates to a process for producing an optical glass according to an ion exchange method. The optical glass obtained according to the present invention is largely divided into a uniform refractive index type glass and a gradient refractive index type glass. The former glass is used mainly as an optical glass in the fields of optics and optoelectronics, and the latter glass is used as a gradient index lens mainly for optical coupling between optical fibers or between a light source and an optical fiber, or as an microlens array.

2. Description of the Prior Art

The conventional processes for producing such a uniform refractive index type glass or such a gradient refractive index type glass include, for example, a process according to an ion exchange method which is described in Japanese Patent Application Kokai (Laid-Open) No. 222943/1986.

In the process, a glass containing $Na^+$, $K^+$, etc. in large amounts is immersed in a molten salt containing ions giving a higher refractive index, such as $Ag^+$, $Tl^+$, $Li^+$ and the like to subject the ions contained in the glass (i.e. $Na^+$, $K^+$, etc.) to sufficient ion exchange with the ions giving a higher refractive index (i.e. $Ag^+$, $Tl^+$, $Li^+$, etc.) and thereby to produce a uniform refractive index type glass in which the concentration of the ions giving a higher refractive index is uniform throughout the entire ranges from the center of the glass to its outer surface and whose refractive index is uniform throughout said ranges, and then this glass is subjected to ion exchange in a molten salt containing $Na^+$, $K^+$, etc. to produce a gradient refractive index type glass.

However, in producing a uniform refractive index type glass, the above process has a drawback in that only one kind of uniform refractive index type glass having a particular refractive index is obtained from one type of starting glass as long as the type of the molten salt remains same, because the ion exchange between the ions contained in the starting glass and the ions giving a higher refractive index is conducted until the concentrations of these ios in glass reach an equilibrium.

Various glasses of uniform refractive index type, ranging in refractive index from 1.46 to 1.98 and in Abbe's number νd from 20 to 91 are required even now for designing of diversified optical products. Therefore, in order to produce, according to the conventional process, a uniform refractive index type glass having a desired refractive index and other good optical properties so as to meet the intended applications(s), it has been necessary to prepare in advance according to the melting method, a number of starting glasses each having a different and particular composition or ion concentration as to enable production of said various glasses.

Also in producing a gradient refractive index type lens, the above process has a drawback in that only one kind of gradient refractive index type lens having a particular numerical aperture is obtained because a lens satisfying optical properties (e.g. aberration) can be obtained only in an optimum ion exchange time. A preferable numerical aperture is said to be at least 0.6 when a gradient refractive index type lens is used for optical coupling between a LD light source and an optical fiber, 0.2 to 0.3 when the lens is used for optical coupling between optical fibers, and 0.05 to 0.2 when the lens is used as a microlens array for copying machine. Therefore, in order to produce, according to the conventional process, lenses each having any desired numerical aperture so as to be used in any particular applications, it has been necessary to prepare in advance according to the melting method, a number of starting glasses each having a different and particular composition or ion composition as to enable production of said various lenses.

Hence, the first object of the present invention is to provide a process for producing from a same starting glass, a number of uniform refractive index type glasses each having any desired and different refractive index and good optical properties.

The second object of the present invention is to produce from a same starting glass, a number of gradient refractive index type glasses each having any desired and different refractive index distribution and good optical properties.

Other objects of this invention will become apparent from the following description and the accompanying drawings.

SUMMARY OF THE INVENTION

The first object of the present invention mentioned above can be achieved by a process for producing a uniform refractive index type optical glass, which comprises: a first step of immersing a glass containing the first ion(s), in a molten salt containing the second ion(s) giving a higher refractive index than the first ion(s) and capable of ion-diffusing into the glass, up to any desired stage before the concentration of the second ion(s) diffused into the glass reaches a saturation point (i.e. an equilibrium) and becomes uniform throughout the entire ranges from the center of the glass to its outer surface, to exchange the part of the first ion(s) in the glass with the second ion(s) and thereby to form a glass in which each concentration of the first ion(s) and the second ion(s) is not uniform throughout the entire ranges from the center of the glass to its outer surface, and a second step of heating the glass formed in the first step to an extent in which each concentration of the first ion(s) and the second ion(s) in the glass becomes substantially uniform throughout the entire ranges from the center of the glass to its outer surface. According to this process, it has become possible to produce from a same starting glass, a number of uniform refractive index type glass each having any desired and different refractive index.

The second object of the present invention mentioned above can be achieved by a process for producing a gradient refractive index type glass, which comprises: the first step mentioned above, the second step also mentioned above, and a third step of immersing the uniform refractive index type glass formed in the second step, in a molten salt containing the third ion(s) giving a lower refractive index than the second ion(s), to exchange the part of the second ion(s) in the glass with the third ion(s) and thereby to obtain a gradient refractive index type glass in which the concentration of the second ion(s) decreases parabolically from the center of the glass to its outer surface and the concentration of the third ion(s) increases parabolically from the center of the glass to its outer surface and accordingly whose refractive index decreases from the center of the glass to its outer surface. According to this process, it has become possible to produce from a same starting glass, a number of gradient refractive index type glass each having any desired and different numerical aperture.

BRIEF EXPLANATION OF THE DRAWINGS

FIG. 4(A) gives a perspective view of a plate-like glass used as a starting glass and FIG. 4(B) gives a graph showing the distribution of refractive index in the resulting slab lens whose refractive index decreases only in the thickness direction from the thickness center to its outer surface.

FIG. 5(A) gives a perspective view of a spherical glass used as a starting glass and FIG. 5(B) gives a graph showing the distribution of refractive index in the resulting spherical lens whose refractive index decreases in the radius direction from the lens center to its outer surface.

DETAILED DESCRIPTION OF THE INVENTION

Firstly, the process for preparing a uniform refractive index type optical glass is described in detail.

Figure 1A:
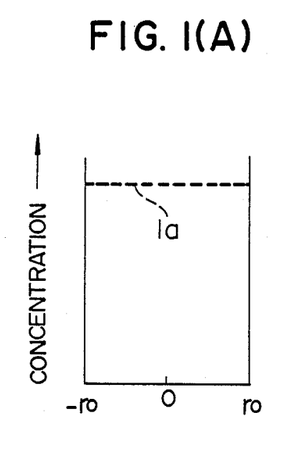
FIGS. 1(A), (B), (C) and (D) give graphs showing the distributions of ion concentrations in glass, before or after each step of the present process.
Figure 1B:
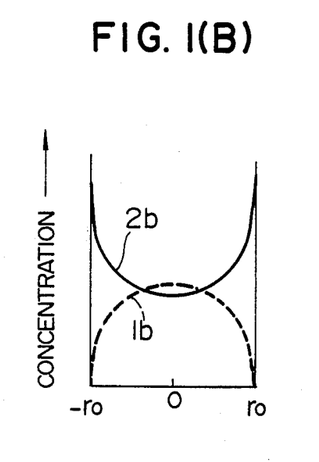
Figure 1C:
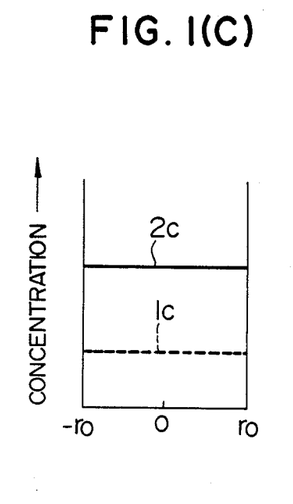
Figure 3A:
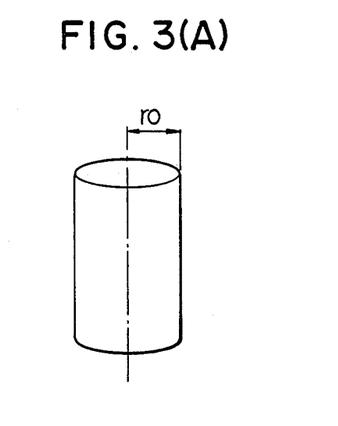
FIG. 3(A) gives a perspective view of a glass rod used as a starting glass and FIG. 3(B) gives a graph showing the distribution of refractive index in the resulting gradient refractive index type lens.

From FIGS. 1(A) to (C) show the distributions of ion concentrations in glass before or after each step when the present process for producing a uniform refractive index type glass has been effected using, as a starting glass, a rod-shaped glass having a radius $r_O$ as shown in FIG. 3(A).

At first, a rod-shaped glass containing ions such as $Na^+$, $K^+$ and the like (these ions are hereinafter referred to as the first ion(s)) in large amounts are produced according to the melting method. This glass is used as a starting glass. The concentration c of the first ion(s) in the starting glass is uniform throughout the entire radius ranges of $r_O$ and $-r_O$ from the center O of the glass to its outer surface, as shown by a dotted line 1a in FIG. 1(A).

The starting glass is immersed, at a given temperature (T) for a given time (t), in a molten salt such as a molten nitrate or sulfate of ions capable of giving a higher refractive index such as $Ag^+$, $Tl^+$, $Cs^+$, $Li^+$ and the like (these ions are hereinafter referred to as the second ion(s)) to conduct ion exchange between the part of the first ion(s) in the starting glass and the second ion(s) of the molten salt (first step). In this first step of the present process, it is essential that the above ion exchange be terminated at any desired stage before the concentration in the glass, of the second ion(s) diffused into the glass from the molten salt reaches a saturation point (i.e. an equilibrium) and becomes uniform throughout the entire radius ranges of $r_O$ and $-r_O$ from the center O of the glass to its outer surface. By the first step, there is obtained a glass in which the concentration of the first ion(s) decreases parabolically throughout the entire radius ranges of $r_O$ and $-r_O$ from the center O of the glass to its outer surface as shown by the dotted line 1b of FIG. 1(B) and the concentration of the second ion(s) increases parabolically throughout the entire radius ranges of $r_O$ and $-r_O$ from the center O of the glass to its outer surface as shown by the solid line 2b and thus each concentration of the first ion(s) and the second ion(s) is not uniform throughout the entire radius ranges of $r_O$ and $-r_O$ from the center O of the glass to its outer surface.

Next, the glass is taken out from the molten salt and is heated to an extent in which each concentration of the first ion(s) and the second ion(s) in the glass becomes substantially uniform throughout the entire radius ranges of $r_O$ and $-r_O$ from the center O of the glass to its outer surface (second step). By this step, there is obtained an intended glass of uniform refractive index type in which as a result of the interdiffusion between the first ion(s) and the seocnd ion(s), each concentration of the first ion(s) and the second ion(s) in the glass is substantially uniform, as shown by the dotted line 1c and the solid line 2c of FIG. 1(C), throughout the entire radius ranges of $r_O$ and $-r_O$ from the center O of the glass to its outer surface.

Next, the control of the refractive index of the uniform refractive index type glass is explained. When it is intended to produce a glass having a refractive index lower than that of the above obtained glass, the time for which the starting glass is immersed in the molten salt in the first step is made shorter than the time t used above, and/or the temperature at which the starting glass is immersed in the molten salt in the first step is made lower than the temperature T used above. By employing such a time and/or temperature, the amount of the second ion(s) diffused into the glass from the molten salt is decreased and a uniform refractive index type glass of lower refractive index is obtained.

Conversely, when it is intended to produce a glass having a higher refractive index, the time for which the starting glass is immersed in the molten salt in the first step is made longer than the time t, and/or the temperature at which the starting glass is immersed in the molten salt in the first step is made higher than the temperature T. By employing such a time and/or temperature, the amount of the second ion(s) diffused into the glass from the molten salt is increased and a uniform refractive index type glass of higher refractive index is obtained.

Thus in the present invention, many uniform refractive index type glasses each having any desired and different refractive index can be produced from one starting glass. This is the biggest advantage of the present invention.

Secondly, the process for producing a gradient refractive index type glass is described in detail.

Figure 3B:
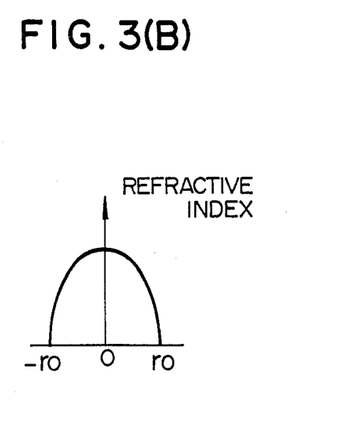

This gradient refractive index type glass can be obtained by effecting the first and second steps mentioned above to form a uniform refractive index type glass and then effecting a third step of immersing the uniform refractive index type glass in a molten salt containing the third ion(s) (e.g. $Na^+$, $K^+$) giving a lower refractive index than the second ion(s) to exchange the part of the second ion(s) in the glass with the third ion(s). By this third step, there is obtained a gradient refractive index type glass in which the concentration of the second ion(s) decreses parabolically throughout the entire radius ranges of $r_O$ and $-r_O$ from the center O of the glass to its outer surface as shown by the solid line $2d$ of FIG. 1(D) and conversely the concentration of the third ion(s) increases parabolically throughout the entire radius ranges of $r_O$ and $-r_O$ from the center O of the glass to its outer surfaceas shown by the broken line $3d$ of FIG. 1(D) and as a result whose refractive index decreases throughout the entire radius ranges of $r_O$ and $-r_O$ from the center O of the glass to its outer surface as shown in FIG. 3(B).

Figure 1D:
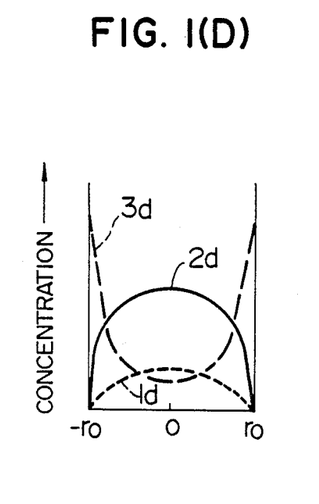

After the third step, the concentration of the first ion(s) in the gradient refractive index type glass decreases parabolically throughout the entire radius ranges of $r_O$ and $-r_O$ from the center O of the glass to its outer surface, as shown by the dotted line $1d$ of FIG. 1(D). This, however, has only a small effect on the refractive index distribution of the glass.

Next, the control of the numerical aperture of the gradient refractive index type glass is explained. When it is intended to produce a lens having a numerical aperture smaller than that of the above obtained glass, the time for which the starting glass is immersed in the molten salt in the first step is made shorter than the time t used above, and/or the temperature at which the starting glass is immersed in the molten salt in the first step is made lower than the temperature T used above. By employing such a time and/or temperature, the amount of the second ion(s) diffused into the glass from the molten salt is decreased; the distribution of the second ion(s) concentration in the glass obtained in the third step becomes less gradient throughout the entire radius ranges of $r_O$ and $-r_O$ between the center O of the glass and its outer surface; and there is obtained a gradient refractive index type lens having a smaller numerical aperture.

Conversely, when it is intended to produce a lens having a larger numerical aperture, the time for which the starting glass is immersed in the molten salt in the first step is made longer than the time t, and/or the temperature at which the starting glass is immersed in the molten salt in the first step is made higher than the temperature T. By employing such a time and/or temperuture, the amount of the second ion(s) diffused into the glass from the molten salt is increased; the distribution of the second ion(s) concentration in the lens obtained in the third step becomes more gradient throughout the entire radius ranges of $r_O$ and $-r_O$ between the center O of the lens and its outer surface; and there is obtained a gradient refractive index type lens having a larger numerical aperture.

Thus in the present invention, many gradient refractive index type glasses each having any desired and different numerical aperture can be produced from one starting glass. This is the biggest advantage of the present invention.

Figure 4A:
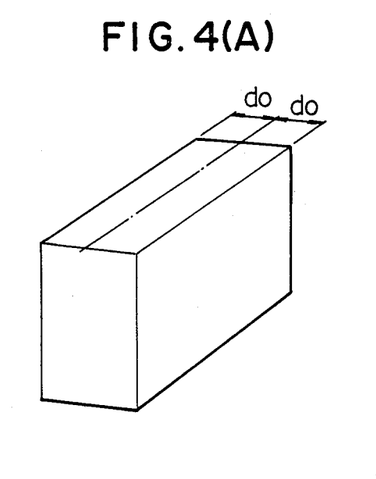
Figure 4B:
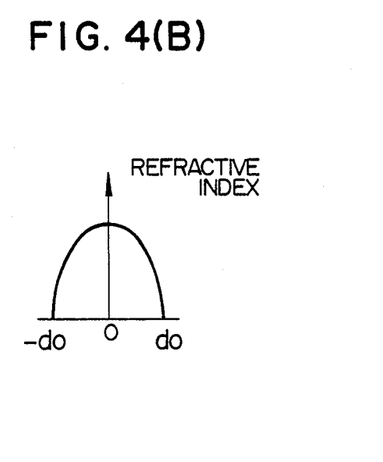
Figure 5A:
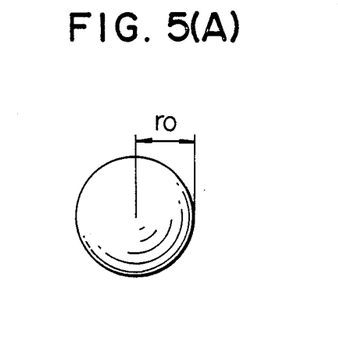
Figure 5B:
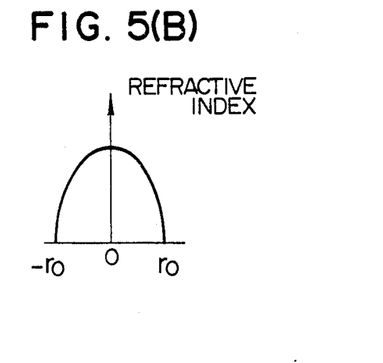

In the above, the process for producing a uniform refractive index type glass and a gradient refractive index type glass were described for respective cases using, as the starting glass, a rod-shaped glass as shown in FIG. 3(A). Change of the shape of the starting glass into a different shape enables production of a uniform or gradient refractive index type glass of different shape. For example, there can be used, as the starting glass, a plate-like glass having a thickness of $2d_O$ as shown in FIG. 4(A) or a spherical glass having a radius of $r_O$ as shown in FIG. 5(A). When the plate-like glass as shown in FIG. 4(A) is used to produce a gradient refractive index type lens, the lens is a gradient refractive index type slab lens whose refractive index decreases only in one direction (i.e. the direction of the thickness $d_O$ and $-d_O$) from the center O of the lens to its outside surface, as shown in FIG. 4(B). When the spherical glass as shown in FIG. 5(A) is used to produce a gradient refractive index type lens, the lens is a gradient refractive index type spherical lens whose refractive index decreases parabolically throughout the entire radius ranges of $r_O$ and $-r_O$ from the center O of the lens to its outer surface, as shown in FIG. 5(B).

It is also possible to use, as the starting glass, a glass processed into a lens shape, such as a concave lens, a convex lens, a nemiscus lens or the like.

In the present invention, when $Ag^+$ is used as the second ion, the starting glass is preferred to be a phosphate glass because the phosphate glass can contain $Ag^+$ in a larger amount than a silicate or borate glass which can contain $Ag^+$ only in a fairly small amount.

Figure 2A:
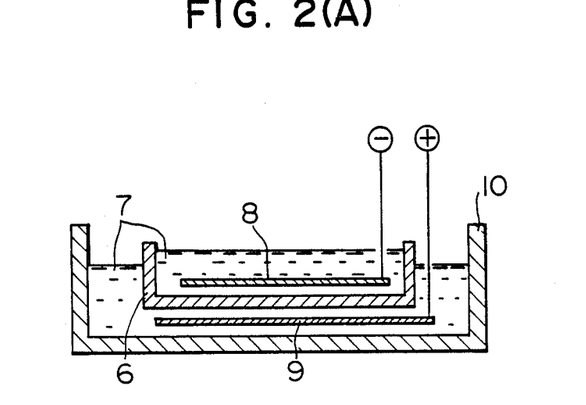
FIG. 2(A) gives a sectional view of an apparatus used when the first step of the present process is conducted according to the electromigration method and FIG. 2(B) gives a graph showing the distributions of ion concentrations in the glass after the first step.
Figure 2B:
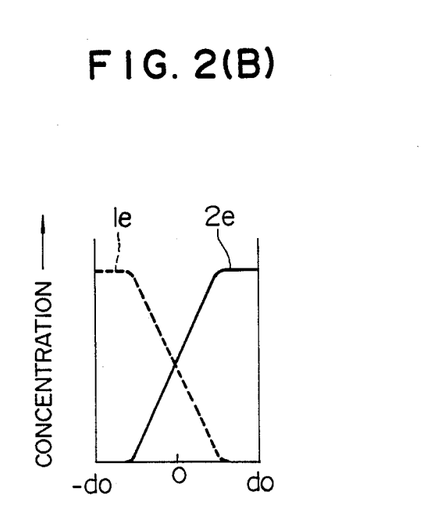

In the present invention, it is possible that the first step be effected according to the electromigration method, wherein the second ion(s) in the molten salt is migrated into the starting glass while applying an electric field. This electromigration method is carried out using an apparatus as shown in FIG. 2(A). In the apparatus of FIG. 2(A), a container 10 for molten salt is filled with a molten salt 7; a plus electrode 9 is immersed in the molten salt 7; a dish-shaped glass sample 6 having four vertical walls and forming an inner container is also filled with the molten salt 7; a minus electrode 8 is immersed in the molten salt 7 filled inside the glass container 6. When in this apparatus an electric field of given strength is applied between the electrodes 8 and 9 while maintaining the molten salt 7 at a given temperature, the speed of migration of the second ion(s) into the glass is about several times faster and the time of treatment of the starting glass in the first step can be shortened significantly. When a plate-like glass having a thickness of $2d_O$ and a shape as shown in FIG. 4(A) is subjected in the first step to the electromigration method, each distribution of the first ion(s) and the second ion(s) in the glass after the first step is unsymmetrical in the thickness range of $d_O$ and $-d_O$ from the thickness center O to its outer surface, as shown by the dotted line $1e$ and the solid line $2e$ of FIG. 2(B). By heating the glass in the second step, however, each distribution of the first ion(s) and the second ion(s) can be easily made uniform and there can be obtained an intended uniform refractive index type glass.

Further in production of a gradient refractive index type glass, it is possible that the heating condition in the second step be adjusted so as to provide a glass in which the concentration of the second ion(s) is gradiently distributed and then the glass be subjected to the third step and thus the distribution of refractive index in the final glass product be controlled. Such a technique is also included in the scope of the present invention.

The present invention is explained in more detail referring to Examples. However, the present invention should not be interpreted to be limited to these Examples.

EXAMPLE 1

Production of uniform refractive index type glass

Figure 6A:
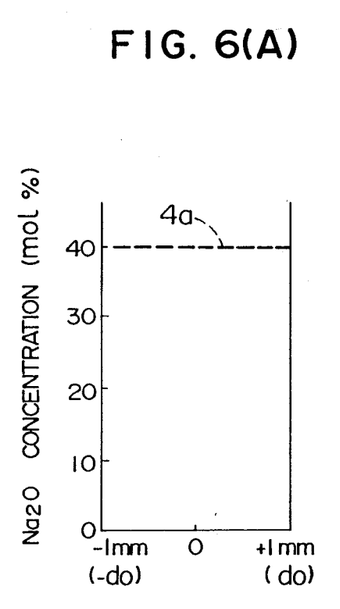
FIGS. 6(A), (B) and (C) give graphs showing the distributions of ion concentrations in glass, before or after each step of Example 1.

There was used, as a starting glass, a plate-like phosphate glass of 25 mm (length)×25 mm (width)×2 mm (thickness) containing 40 mole % of $Na_2O$ and 32 mole % of $P_2O_5$ and having a refractive index $n_d$ of 1.680 and an Abbe's number $\nu d$ of 32.0. As shown by the straight line 4a of FIG. 6(A), the plate-like glass had a uniform $Na_2O$ concentration of 40 mole % throughout the entire thickness ranges of $d_O$ and $-d_O$ from the center O of the glass to its outer surface.

Figure 6B:
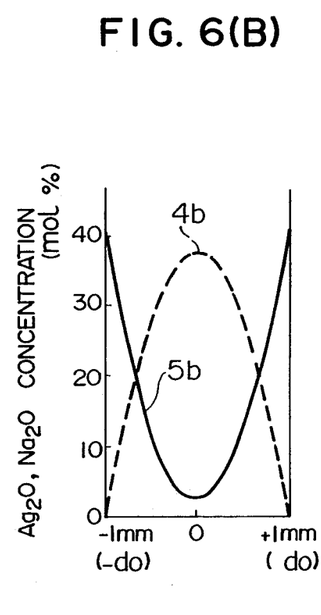

The plate-like glass was immersed for 8 hours in a molten salt of 410° C. consisting of 40% by weight of $AgNO_3$ and 60% by weight of $KNO_3$ to conduct ion exchange between the $Na^+$ in the plate-like glass and the $Ag^+$ in the molten salt (first step). By this first step, the $Na_2O$ concentration in the plate-like glass was decreased parabolically throughout the entire thickness ranges of $d_O$ and $-d_O$ from the center O of the glass to its outer surface, as shown in the curve 4b of FIG. 6(B) and conversely the $Ag_2O$ concentration was increased parabolically in the entire thickness ranges of $d_O$ and $-d_O$ from the center O of the glass to its outer surface, as shown by the curve 5b of FIG. 6(B).

Figure 6C:
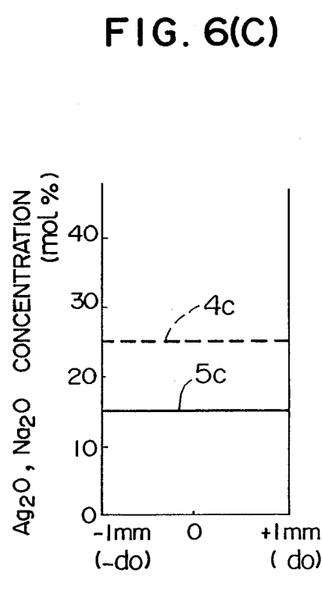

Then, the plate-like glass was taken out of the molten salt and heated in air for 170 hours at 410° C. (second step). By this second step, there was obtained an intended optical glass in which each concentration of $Na_2O$ and $Ag_2O$ was uniform throughout the entire thickness ranges of $d_O$ and $-d_O$ from the center O of the glass to its outer surface, as shown by the straight lines 4c and 5c, respectively, of FIG. 6(C). This optical glass had a refractive index $n_d$ of 1.749 and an Abbe's number $\nu d$ of 29.8.

Figure 7:
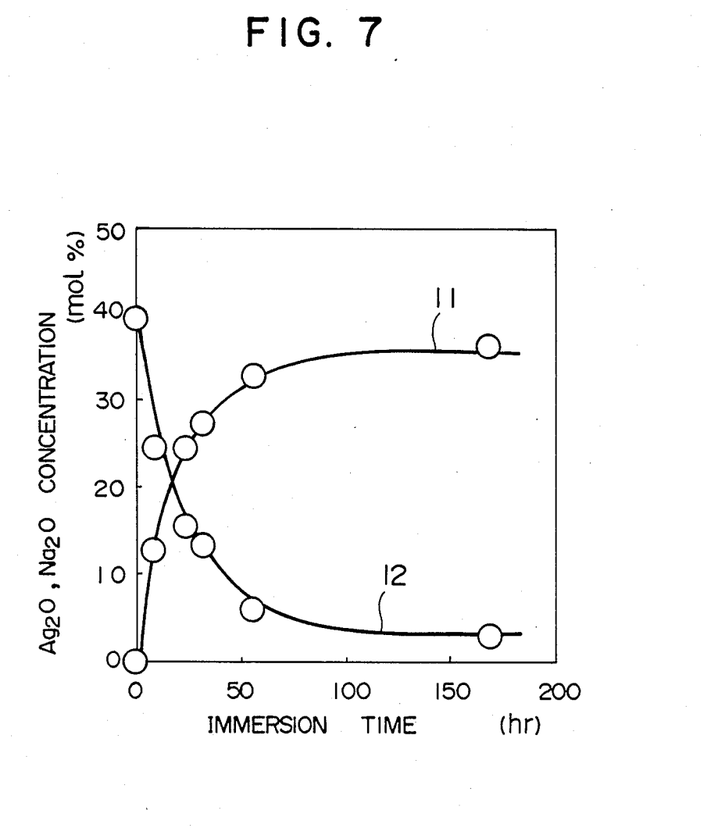
FIG. 7 gives a graph showing the relationship between the ion exchange time in the first step of Example 1 and the ion concentrations in glass.

Various optical glasses were obtained in the same manner as above except that the immersion time (ionexchange time) in the first step was changed, and the average concentrations of $Ag_2O$ and $Na_2O$ in each of these glasses were measured using an electron probe microanalyser (EPMA). The results indicated that as shown in FIG. 7, the average concentration of $Ag_2O$ increased in accordance with the curve 11 and the average concentration of $Na_2O$ decreased in accordance with the curve 12, with the increase of the immersion time in the first step. Thus it is learned that by changing the immersion time in the first step (in this case, each immersion is conducted up to a desired stage before each ion in the glass becomes saturated and uniform throughout the entire thickness), there can be obtained various uniform refractive index type glasses each having a different refractive index and good optical characteristics.

EXAMPLE 2

Production of uniform refractive index type glass

A uniform refractive index type optical glass having a refractive index $n_d$ of 1.880 and an Abbe's number $\nu d$ of 25.3 was obtained in the same manner as in Example 1 except that the immersion time in the first step was changed to 150 hours and the heating time in the second step was changed to 20 hours.

EXAMPLE 3

Production of uniform refractive index type glass

Using an apparatus as shown in FIG. 2(A), the first step was effected according to the electromigration method. That is, the ion exchange in the first step was effected at 530° C. for 20 hours while applying an electric field of 7 V/mm, using, as a starting glass, a 1 mm-thick dish made of a BK 7 optical glass consisting of 68.9% by weight of $SiO_2$, 10.1% by weight of $B_2O_3$, 8.8% by weight of $Na_2O$, 8.4% by weight of $K_2O$, 2.8% by weight of BaO and 1.0% by weight of $As_2O_3$ and having a refractive index $n_d$ of 1.52 and, as a molten salt, a melt consisting of 30 mole % of $TlSO_4$, 40 mole % of $ZnSO_4$ and 30 mole % of $K_2SO_4$.

Then, the heat treatment in the second step was effected at 530° C. for 120 hours, to obtain a uniform refractive index type optical glass having a refractive index $n_d$ of 1.64.

EXAMPLE 4

Production of gradient refractive index type glass

Figure 8A:
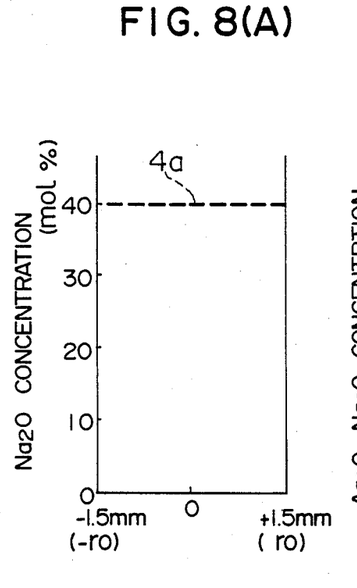
FIGS. 8(A), (B), (C) and (D) give graphs showing the distributions of ion concentrations in glass, before or after each step of Example 4.

There was used, as a starting glass, a glass rod of 3 mm in diameter consisting of a phosphate glass containing 40 mole % of $Na_2O$. This glass rod had a uniform $Na_2O$ concentration of 40 mole % throughout the entire radius ranges of $r_O$ and $-r_O$ from the center O of the rod to its outer surface, as shown by the straight line 4a of FIG. 8(A).

Figure 8B:
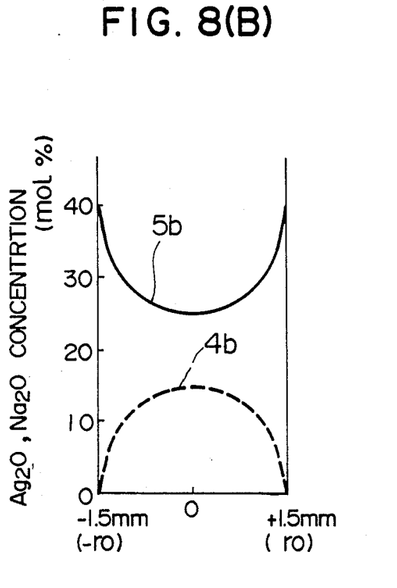

This glass rod was immersed for 150 hours in a molten salt of 400° C. consisting of 40% by weight of $AgNO_3$ and 60% by weight of $KNO_3$ to conduct ion exchange between the $Na^+$ in the rod and the $Ag^+$ in the molten salt (first step). By the first step, the concentration of $Na_2O$ was decreased parabolically throughout the entire radius ranges of $r_O$ and $-r_O$ from the center O of the rod to its outer surface, as shown by the curve 4b of FIG. 8(B) and conversely the concentration of $Ag_2O$ was increased parabolically throughout the entire radius ranges of $r_O$ and $-r_O$ from the center O of the rod to its outer surface, as shown by the curve 5b of FIG. 8(B).

Figure 8C:
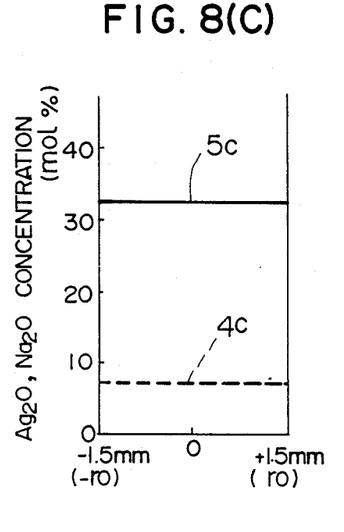

Then, the glass rod was taken out of the molten salt and heated in air at 400° C. for 120 hours (second step). By this second step, there was obtained a uniform refractive index type glass rod in which each concentration of $Na_2O$ and $AgNO_3$ was uniform throughout the entire radius ranges of $r_O$ and $-r_O$ from the center O of the rod to its outer surface, as shown by the straight lines 4c and 5c, respectively, of FIG. 8(C).

Figure 8D:
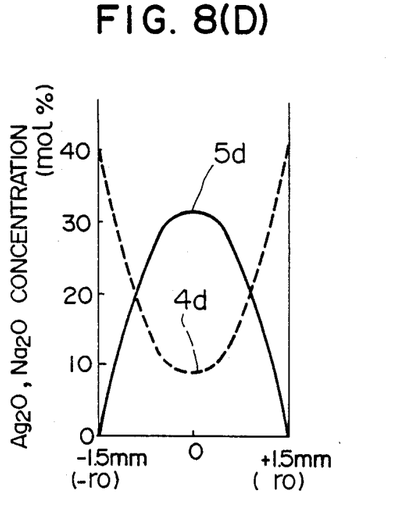

Subsequently, this glass rod was immersed in a molten salt of $Na_2NO_3$ of 420° C. for 18 hours to conduct ion exchange between the $Ag^+$ in the rod and the $Na^+$ in the molten salt (third step). By this third step, there was obtained a gradient refractive index type lens in which the concentration of $Ag_2O$ decreased parabolically throughout the entire radius ranges of $r_O$ and $-r_O$ from the center O of the lens to its outer surface, as shown by the curve 5d of FIG. 8(D) and the concentration of $Na_2O$ increased parabolically throughout the entire radius ranges of $r_O$ and $-r_O$ from the center O of the lens to its outer surface, as shown by the curve 4d of FIG. 8(D) and as a result whose refractive index decreased throughout the entire radius ranges of $r_O$ and $-r_O$ from the center O of the lens to its outer surface. This lens had a numerical aperture of 0.48.

EXAMPLE 5

Production of gradient refractive index type glass

By using the same glass rod and same molten salt as in Example 4 but by conducting the ion exchange of the first step at 400° C. for 50 hours, the heat treatment of the second step at 420° C. for 120 hours and the ion exchange of the third step at 440° C. for 13 hours, there was obtained a gradient refractive index type lens having a numerical aperture of 0.30. It is clear from this Example that a gradient refractive index type lens having a numerical aperture different from that of the lens of Example 4 can be produced from the same glass as used in Example 4.

EXAMPLE 6

Production of gradient refractive index type glass

A 1 mm-thick plate made of the same BK 7 optical glass as in Example 3 consisting of 68.9% by weight of $SiO_2$, 10.1% by weight of $B_2O_3$, 8.8% by weight of $Na_2O$, 8.4% by weight of $K_2O$, 2.8% by weight of BaO and 1.0% by weight of $As_2O_3$ was immersed for 100 hours in a molten salt of 530° C. consisting of 30 mole % of $Tl_2SO_4$, 40 mole % of $ZnSO_4$ and 30 mole % of $K_2SO_4$ to conduct the ion exchange of the first step. Then, the glass plate was heated in air at 530° C. for 80 hours to conduct the second step. Subsequently, the glass plate was immersed for 55 hours in a molten salt of $KNO_3$ of 530° C. to conduct the ion exchange of the third step, whereby there was obtained a gradient refractive index type lens having a numerical aperture of 0.35.

EXAMPLE 7

Production of gradient refractive index type glass

Using an apparatus as shown in FIG. 2(A), the first step was effected in accordance with the electromigration method. That is, the ion exchange of the first step was conducted at 530° C. for 20 hours while applying an electric field of 7 V/mm, using, as a starting glass, a 1 mm-thick dish made of the same BK 7 optical glass as in Example 6 and, as a molten salt, the same one as in Example 6.

Next, the dish-like glass was heated in air at 530° C. for 120 hours to conduct the second step. Subsequently, the ion exchange of the third step was conducted in the same manner as in Example 6, whereby there was obtained a gradient refractive index type lens having the optical properties similar to those of the lens of Example 6.

In the above Examples 4, 5, 6 and 7, uniform refractive index type glass were formed in respective intermediate steps. Needless to say, these uniform refractive index type glasses are also products intended by the process of the present invention.

COMPARATIVE EXAMPLE

A gradient refractive index type lens was produced according to the prior art process described in Japanese Patent Application Kokai (Laid-Open) No. 222943/1986.

Figure 9A:
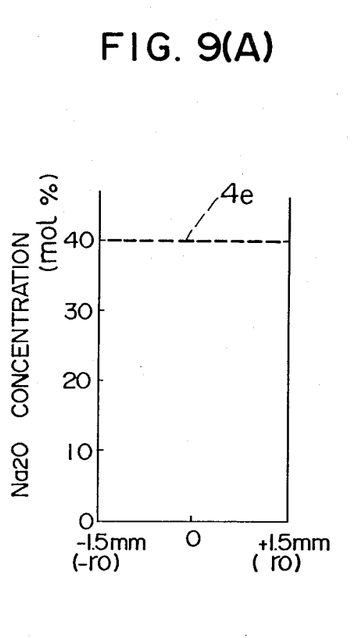
FIGS. 9(A), (B) and (C) give graphs showing the distributions of ion concentrations in glass, before or after each step of Comparative Example.

There was used, as a starting glass, a glass rod of 3 mm in diameter consisting of a phosphate glass containing 40 mole % of $Na_2O$ (the glass rod had the same composition and shape as the glass rods used in Examples 4 and 5). The $Na_2O$ concentration in the glass rod was uniform at 40 mole % throughout the entire radius ranges of $r_O$ and $-r_O$ *l from the center O of the rod to its outer surface, as shown by the straight line 4e* of FIG. 9(A).

Figure 9B:
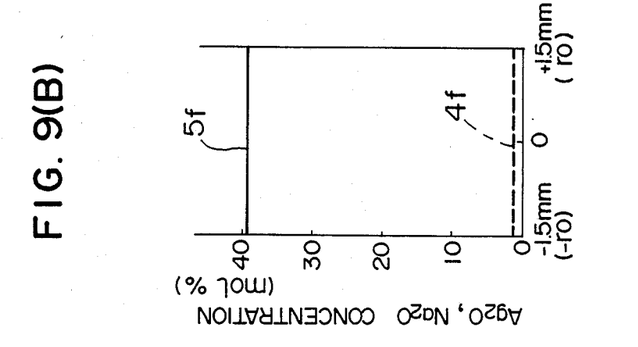

The glass rod was immersed for 240 hours in a molten salt of 400° C. consisting of 40% by weight of $AgNO_3$ and 60% by weight of $KNO_3$ (the molten salt was also same as those used in Examples 4 and 5) to conduct the ion exchange of the first step between the $Na^+$ in the glass rod and the $Ag^+$ in the molten salt. By this ion exchange of the first step, there was obtained a uniform refractive index type glass rod in which the $Ag_2O$ concentration was uniformly saturated at about 40 mole % throughout the entire radius ranges of $r_O$ and $-r_O$ from the center O of the rod to its outer surface, as shown by the straight line 5f of FIG. 9(B) and the $Na_2O$ concentration was also uniformly distributed at a very low level throughout the entire radius ranges of $r_O$ and $-r_O$ from the center O of the rod to its outer surface, as shown by the straight line 4f of FIG. 9(B). The uniform refractive index type glass rod had a refractive index $n_d$ of 1.881.

Figure 9C:
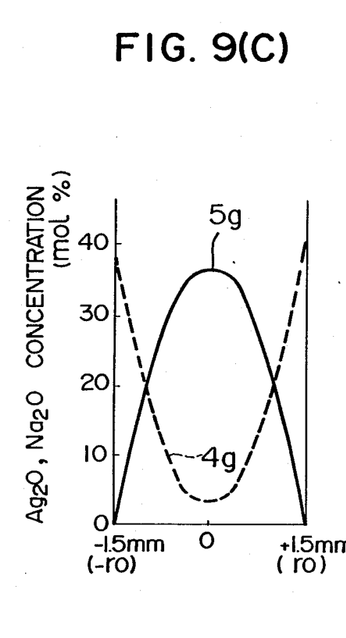

Then, the uniform refractive index type glass rod was immersed for 18 hours in a molten salt of $NaNO_3$ of 400° C. (this molten salt was also same as those used in Examples 4 and 5) to conduct the ion exchange of the second stage between the $Ag^+$ in the glass rod and the $Na^+$ in the molten salt. By this ion exchange of the second step, there was obtained a gradient refractive index type lens in which the concentration of $Ag_2O$ decreased parabolically throughout the entire radius ranges of $r_O$ and $-r_O$ from the center O of the lens to its outer surface, as shown by the curve 5g of FIG. 9(C) and conversely the concentration of $Na_2O$ increased parabolically throughout the entire radius ranges of $r_O$ and $-r_O$ from the center O of the lens to its outer surface, as shown by the curve 4g of FIG. 9(C). This lens had a numerical aperture of 0.69.

According to the process of this Comparative Example it is impossible to produce from the same starting glass as used above, any uniform refractive index type glass having a refractive index different from the above refractive index $n_d$ of 1.88, or any gradient refractive index type glass having a numerical aperture different from the above numerical aperture of 0.69.

As described above in detail, the present process enables easy and reliable production from one starting glass, of various uniform refractive index type glasses each having a desired and different refractive index and also of various gradient refractive index type glasses each having a desired and different numerical aperture. Thus, the present process has a very high industrial significance.

What is claimed is:

1. A process for producing a uniform refractive index type glass, which comprises:
a first step of immersing a glass consisting of the first ion(s), in a molten salt containing the second ion(s) giving a higher refractive index than the first ion(s) and capable of ion-diffusing into the glass, up to any desired stage before the concentration of the second ion(s) diffused into the glass reaches a saturation point or an equilibrium and becomes uniform throughout the entire ranges from the center of the glass to its outer surface, to exchange the part of the first ion(s) in the glass with the second ion(s) and thereby to form a glass in which each concentration of the first ion(s) and the second ion(s) is not uniform throughout the entire ranges from the center of the glass to its outer surface, and a second step of heating the glass formed in the first step to an extent in which each concentration of the first ion(s) and the second ion(s) in the glass becomes substantially uniform throughout the entire ranges from the center of the glass to its outer surface.

2. A process according to claim 1, wherein in the first step, the ion exchange for introducing into the glass the second ion(s) giving a higher refractive index is conducted by applying an electric field to the glass.

3. A process according to claim 1, wherein in the first step, the second ion(s) giving a higher refractive index is at least one member selected from the group consisting of $Ag^+$, $Tl^+$, $Cs^+$ and $Li^+$.

4. A process according to claim 1 or 3, wherein in the first step, the starting glass is a phosphate glass and the first ion giving a higher refractive index is $Ag^+$.

5. A process for producing a gradient refractive index type glass, which comprises:

a first step of immersing a glass containing the first ion(s), in a molten salt containing the second ion(s) giving a higher refractive index than the first ion(s) and capable of ion-diffusing into the glass, up to any desired stage before the concentration of the second ion(s) in the glass reaches a saturation point or an equilibrium and becomes uniform throughout the entire ranges from the center of the glass to its outer surface, to exchange the part of the first ion(s) in the glass with the second ion(s) and thereby to form a glass in which each concentration of the first ion(s) and the second ion(s) is not uniform throughout the entire ranges from the center of the glass to its outer surface, a second step of heating the glass formed in the first step to an extent in which each concentration of the first ion(s) and the second ion(s) in the glass becomes substantially uniform throughout the entire ranges from the center of the glass to its outer surface, and a third step of immersing the glass formed in the second step, in a molten salt containing the third ion(s) giving a lower refractive index than the second ion(s), to exchange the part of the second ion(s) in the glass with the third ion(s) and thereby to obtain a gradient refractive index type glass in which the concentration of the second ion(s) decreases parabolically from the center of the glass to its outer surface and the concentration of the third ion(s) increases parabolically from the center of the glass to its outer surface and accordingly whose refractive index decreases from the center of the glass to its outer surface.

6. A process according to claim 5, wherein in the first step, the ion exchange for introducing into the glass the second ion(s) giving a higher refractive index is conducted by applying an electric field to the glass.

7. A process according to claim 5, wherein the starting glass used in the first step has a cylindrical shape and a gradient refractive infdex type lens is produced whose refractive index decreases throughout the entire radius ranges from the center of the lens to its outer surface.

8. A process according to claim 5, wherein the starting glass in the first step has a plate-like shape and a gradient refractive index type lens is produced whose refractive index decreases only in the thickness direction from the center of the thickness to its outer surface.

9. A process according to claim 5, wherein the starting glass used in the first step has a spherical shape and a gradient refractive index type lens is produced whose refractive index decreases throughout the entire radius ranges from the center of the lens to its outer surface.

10. A process according to claim 5, wherein in the first step, the second ion giving a higher refractive index is at least one member selected from the group consisting of $Ag^+$, $Tl^+$, $Cs^+$ and $Li^+$.

11. A process according to claim 5 or 10, wherein in the first step, the starting glass is a phosphate glass and the second ion giving a higher refractive index is $Ag^+$.

* * * * *